C. R. UEBELMESSER.
FILM ACTUATING MECHANISM.
APPLICATION FILED JAN. 9, 1909.
994,042.
Patented May 30, 1911.
3 SHEETS—SHEET 1.
Fig. 1,
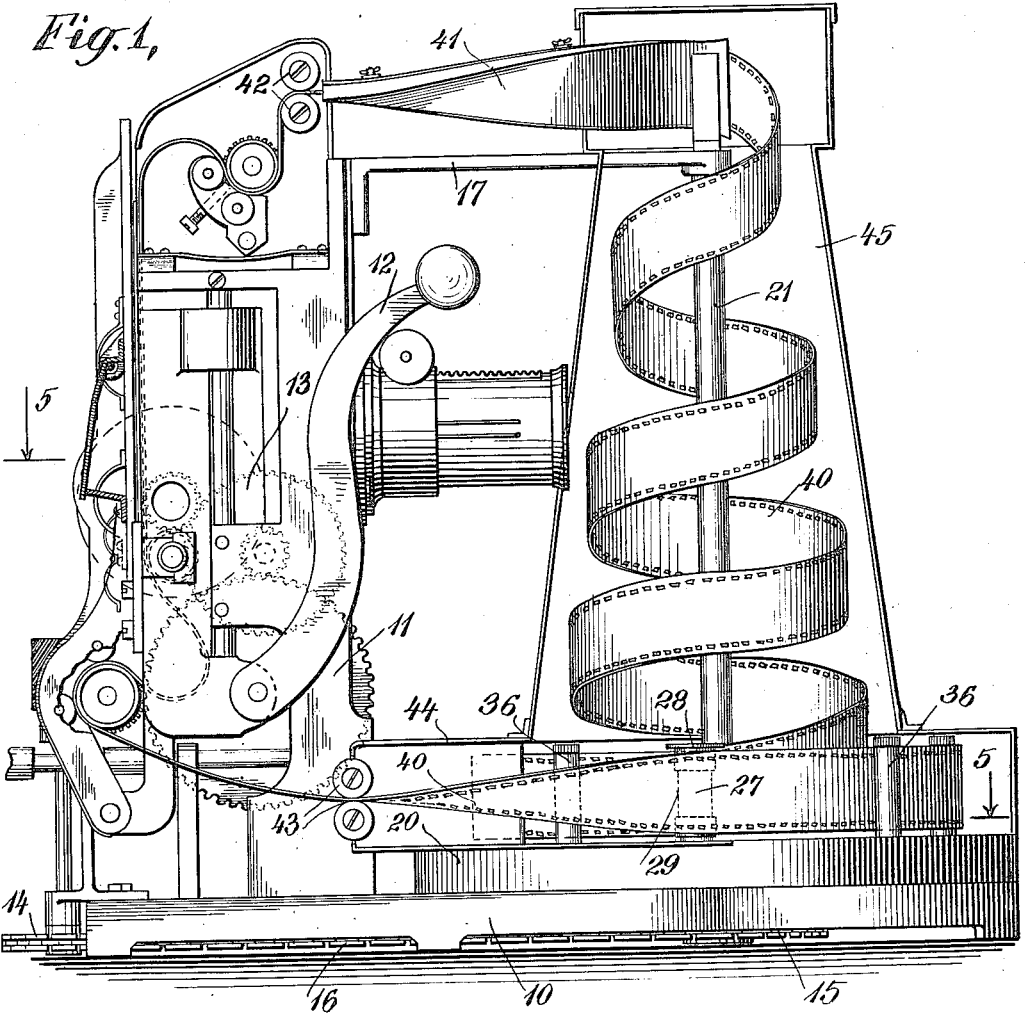
Fig. 2,
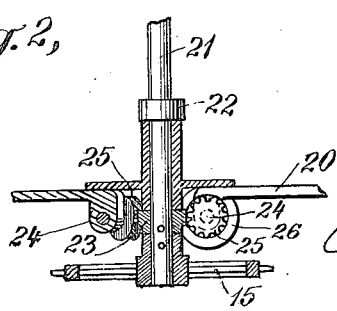
WITNESSES:
INVENTOR
Charles R. Uebelmesser
BY
E. W. Marshall
ATTORNEY C. R. UEBELMESSER.
FILM ACTUATING MECHANISM.
APPLICATION FILED JAN. 9, 1909.
994,042.
Patented May 30, 1911.
3 SHEETS—SHEET 2.
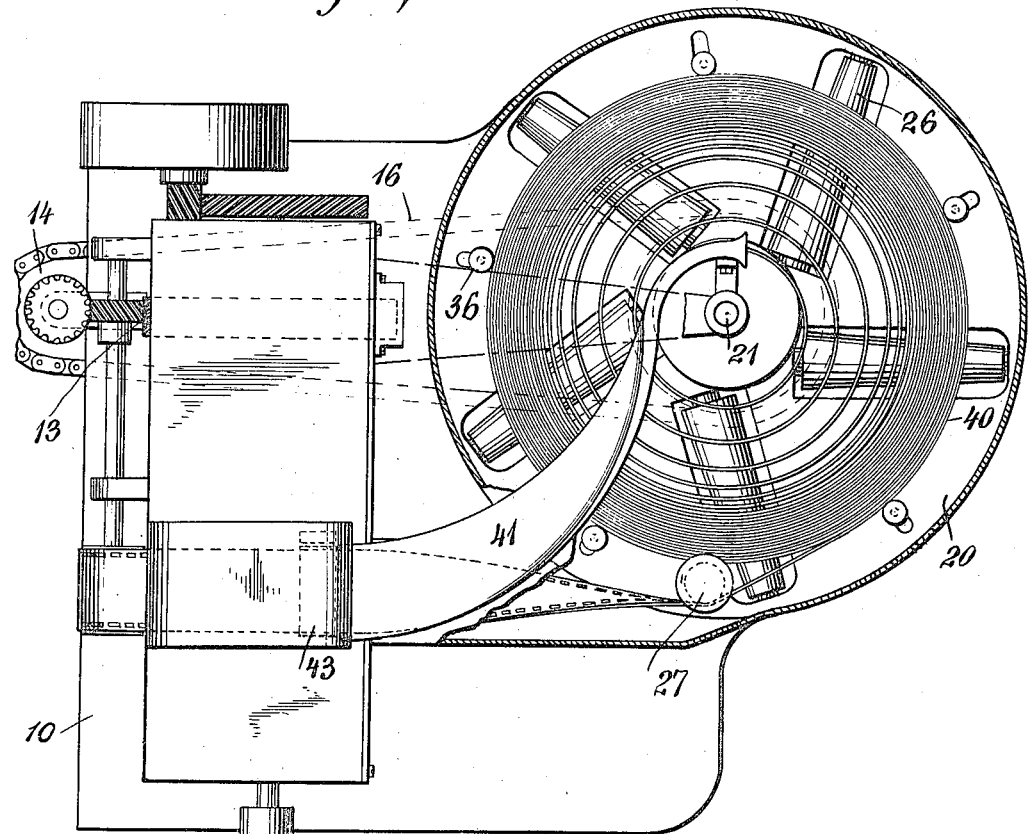
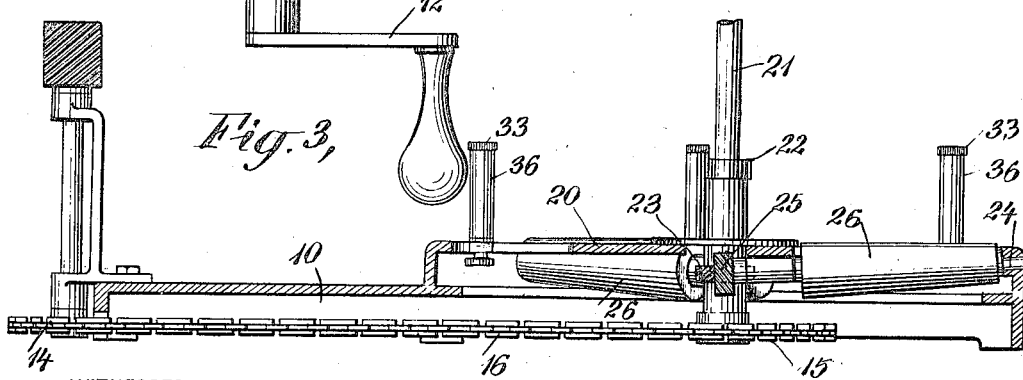
INVENTOR
Charles R. Uebelmesser
BY
E. W. Marshall
ATTORNEY
WITNESSES:

C. R. UEBELMESSER.
FILM ACTUATING MECHANISM.
APPLICATION FILED JAN. 9, 1909.
994,042.
Patented May 30, 1911.
3 SHEETS—SHEET 3.
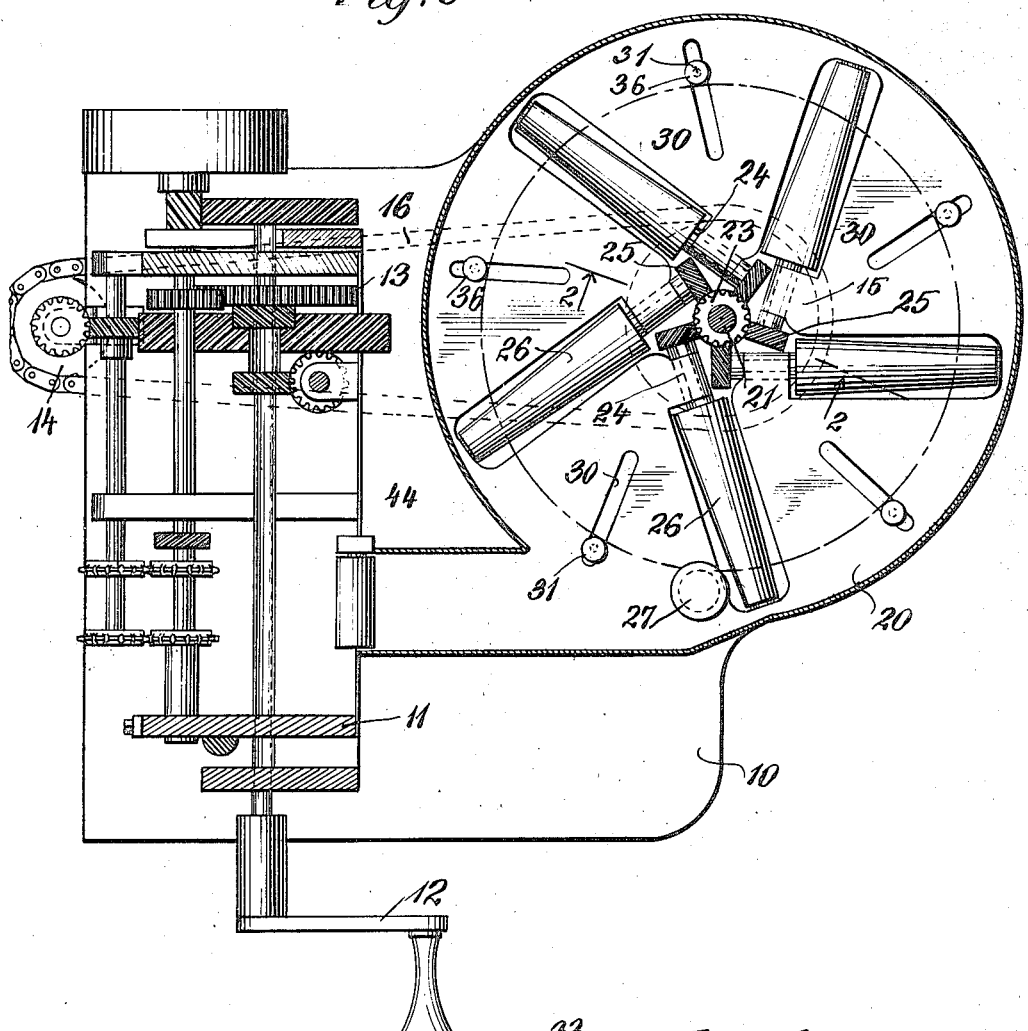
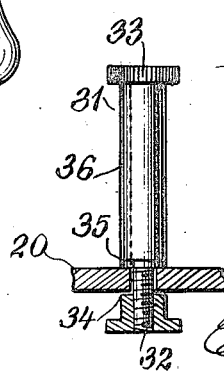
WITNESSES:
INVENTOR
Charles R. Uebelmesser
BY
E. W. Marshall
ATTORNEY

UNITED STATES PATENT OFFICE.

CHARLES R. UEBELMESSER, OF NEW YORK, N. Y., ASSIGNOR TO AMERICAN MOVING PICTURE MACHINE COMPANY, OF NEW YORK, N. Y., A CORPORATION OF NEW YORK.

FILM-ACTUATING MECHANISM.

994,042. Specification of Letters Patent. Patented May 30, 1911.

Application filed January 9, 1909. Serial No. 471,414.

*To all whom it may concern:*

Be it known that I, CHARLES R. UEBELMESSER, a subject of the Emperor of Germany, and a resident of the borough of Manhattan, in the city, county, and State of New York, United States of America, have invented certain new and useful Improvements in Film-Actuating Mechanism, of which the following is a specification.

My invention relates to improvements in film actuating mechanism, such, for example, as those used in moving picture machines. It is especially adaptable for use in conjunction with an apparatus using an endless film.

I will describe my invention in the following specification and set forth the novel features thereof in the appended claims.

Referring to the drawings, Figure 1 is a side elevation, partly in section, of a moving picture machine with my invention applied thereto. Fig. 2 is a sectional side elevation of a detail of construction showing some of the driving gearing. The section in this figure is taken on the line 2—2 of Fig. 5. In Fig. 3 this same gearing and some of its associated parts are shown in side elevation with a part thereof drawn in section. Fig. 4 is a top plan view of the apparatus shown in Fig. 1, and Fig. 5 is a sectional plan view of the same device with the section taken on the line 5—5 of Fig. 1. Fig. 6 is a side elevation of an adjustable guiding roller which I use in conjunction with the other parts of the device.

Like characters of reference designate corresponding parts in all of the figures.

10 designates the base of the apparatus. 11 is the frame of a moving picture machine which is mounted upon and supported by this base.

12 is a crank by means of which gearing 13 and various parts of the apparatus may be driven.

The different parts of the moving picture machine are not more fully described as they form no part of the present invention, but enough of them are shown to fully disclose the invention.

The gearing 13 is arranged to drive a horizontally disposed sprocket-wheel 14 which is connected with a similarly disposed sprocket-wheel 15 by means of a chain 16.

20 designates a film-supporting base which is suitably affixed to the base 10.

21 is a vertical spindle supported by the base 20, with its upper end supported by a bracket 17 projecting from the frame 11 of the machine. A shoulder 22 holds this spindle or shaft against downward movement, but provides for its free rotation. The sprocket-wheel 15 is affixed to the lower end of the spindle 21. Directly above this sprocket-wheel and also affixed to the spindle 21 is a pinion 23.

Supported in the base 20 are a plurality of shafts 24. On one end of each of these shafts is a pinion 25, all of which are in mesh with the pinion 23. It is to be noted that the axes of these horizontal shafts are not radial, but that they are tangential to a circle through the center of the pinions 25. Affixed to each of the shafts 24 is a roller 26 which may be cylindrical, but is preferably made in the form of a truncated cone. The upper surface of the base 20 is cut away to clear these rollers. The roller shafts 24 may be set on an incline as shown in Fig. 3 so that the upper surfaces of the rollers which project through the surface of the base 20 are horizontal.

On the base 20 is a vertical film guiding spool 27, the upper portion of which forms an overhanging flange 28. This spool is rotatably supported, and that portion of its surface which is adjacent to the picture-bearing portion of the film is cut away as at 29 so that the film in passing over cannot become injured by its contact therewith.

The base 20 is provided with a plurality of slots 30 in which are adjustable film guiding rollers 31, the construction of which is shown somewhat in detail in Fig. 6. Each of these comprises a spindle 32 having a knurled head 33. The diameter of its lower end is slightly reduced and is threaded to fit into a flanged nut 34. 35 is a washer between which and the head 33 of the spindle is loosely supported the roller proper 36. It may be seen that these rollers may be moved in or out in their respective slots and securely held to the base 20 at the desired points by tightening the spindles in the nuts 34.

The film is designated in the drawings by 40. It is passed into the machine through a flat twisted metallic chute 41 and between a pair of rollers 42. It is then threaded down through the machine, over the driving sprockets and mechanism, and out between a pair of horizontal rollers 43. Then it is turned over into a vertical position and passed under the flange 28 on the guiding spool 27 and inside of the vertical guiding rolls. Most of the convolutions of the film-roll will then rest upon the upper surfaces of the rollers 26. The inner convolutions of the film-roll will, however, be lifted up in the form of a spiral cone about the spindle 21 to join that part of the film which has been passed through the chute 41. The ends of the film may be cemented or otherwise joined together so that it will be endless.

44 is a metallic box or cover for that part of the film which rests upon the rollers 26, and 45 is a cone-shaped extension of this cover which incloses the other convolutions of the film up to the chute 41. The film then is entirely covered from the point where it leaves the machine to the point where it enters it again, and as it may be suitably covered inside of the machine itself, all danger of exposure to fire is eliminated.

The operation of this device is as follows: When the machine is operated to pass the pictures on the film over a given orifice in rapid succession in the usual manner it will be drawn into the machine through the chute 41 and will pass out between the rollers 43. The rollers 26 will be rotated by the motive power of the machine at a rate of speed proportional to that at which the film is passed through the machine. The rollers 26 will cause the film-coil which rests upon them to be rotated about the spindle 21. The manner in which the rollers are set has a tendency to drive the outer convolutions of the film-coil in toward the spindle, thus causing the film to be wound up upon the coil. At the same time the other convolutions of the film-coil are moved in toward the center by the rollers to take the place of those which are removed from the inner portion of the film-coil and drawn into the machine. The inner diameter of the rollers 26 is greater than their outer diameter so that they will drive the convolutions of the film-coil which are nearer the spindle at a greater rate of linear speed than they drive the outer convolutions. This is for the purpose of keeping the various layers of the film-coil away from each other. At the same time, the inner convolutions of the film-coil will be raised up around the spindle and drawn into the machine through the chute 41. The spindle 21 may be stationary, but I prefer to have it rotate in unison with the film-coil to avoid all possibility of the film catching or becoming scratched thereon.

The guiding spool 27 is provided for the purpose of properly positioning the film on the rollers 26 as it comes out of the machine. The guiding rolls 36 are provided for the purpose of maintaining the film-coil within the desired space, and as the films are of variable lengths the positions of these rollers are made adjustable so that they may be moved in or out at will to properly guide the film-coils of different diameters.

One of the great advantages of this device is that the film is wound and unwound without having its inner surface, upon which the pictures are placed, come in contact with other portions of the film-coil so that they do not easily become scratched or injured.

What I claim is.—

1. In a film-actuating mechanism, means for driving a film by frictional contact with the edges thereof.

2. A film-actuating mechanism comprising a rotatable member arranged to frictionally engage with the edge of a film.

3. A film-actuating mechanism comprising a roller upon which one of the edges of a film is arranged to rest, and means for rotating the roller and thereby imparting linear movement to the film.

4. A film-actuating mechanism comprising a plurality of rollers upon which one of the edges of a film is arranged to rest, and means for rotating said rollers together and thereby imparting linear movement to the film in desired directions.

5. A film-actuating mechanism comprising a plurality of rollers disposed about a center, said rollers being arranged to support the convolutions of a film-coil by one of the edges of the film, means for rotating said rollers and thereby rotating the film-coil and winding the film upon the film-coil.

6. A film-actuating mechanism comprising a central vertical spindle, a plurality of rollers disposed about said spindle, said rollers being arranged to support the convolutions of a film-coil by one of the edges of the film, means on the spindle for rotating said rollers and thereby rotating the film-coil and winding the film upon the film-coil, said rollers being disposed obliquely to the radii from said spindle through the outer ends of the axes of the rollers so that they move the convolutions of the film-coil toward the central spindle.

7. A film-actuating mechanism comprising a central vertical rotatable spindle, a plurality of rollers disposed about said spindle, said rollers being arranged to support the convolutions of a film-coil by one of the edges of the film, means for imparting the rotation of the spindle to said rollers, said rollers being arranged to rotate the film-coil and to wind the film upon the outside of the film-coil, and means for unwinding the film-coil from its inner convolutions.

8. A film-actuating mechanism comprising a film-supporting base, a central vertical rotatable spindle, a plurality of rollers disposed about said spindle, said rollers having their upper surfaces projecting through said base and arranged to support the convolutions of a film-coil by one of the edges of the film, means for imparting the rotation of the spindle to the rollers, said rollers being arranged to rotate the film-coil and to wind the film upon the outside of the film-coil, the rollers being so disposed that they move the convolutions of the film-coil toward the central spindle, the inner diameter of said rollers being greater than their outer diameter, and means for unwinding the film-coil from its inner convolutions.

9. A film-actuating mechanism comprising a film-supporting base, a central vertical spindle, means for rotating said spindle, a plurality of rollers of resilient material disposed about said spindle, said rollers having their upper surfaces projecting through said base at right-angles to the spindle and arranged to support the convolutions of a film-coil by one of the edges of the film, gearing arranged to impart the rotation of the spindle to the rollers, said rollers being arranged to rotate the film-coil and to wind the film upon the outside of the film-coil, the rollers being so disposed that they move the convolutions of the film-coil toward the spindle, the inner diameter of said rollers being greater than their outer diameter, means for unwinding the film-coil from its inner convolutions, and guiding rollers adjustably supported upon said base.

10. In combination with a moving picture machine, a film-actuating mechanism comprising means for driving a film by frictional contact with the edge thereof.

11. In combination with a moving picture machine, a film-actuating mechanism comprising a rotatable member arranged to frictionally engage with the edges of a film to impart linear movement thereto.

12. In combination with a moving picture machine, means for actuating said machine, a film-actuating mechanism comprising a plurality of rollers upon which one of the edges of a film is arranged to rest, and means for rotating said rollers together from said machine and thereby imparting linear movement to the film in desired directions.

13. A moving picture machine, driving mechanism therefor, and means for rotating said mechanism, combined with a film-actuating mechanism comprising a plurality of rollers arranged to frictionally engage with the edge of a film, and means for rotating said rollers from the driving mechanism.

14. A moving picture machine, driving mechanism therefor, and means for rotating said mechanism, combined with a film-actuating mechanism comprising a plurality of rollers arranged to frictionally engage with the edge of a film, and intermediate mechanism for imparting rotation to said rollers from the driving mechanism at speeds proportional to that of the driving mechanism.

15. A moving picture machine, mechanism therefor arranged to drive a film through said machine, and means for rotating said mechanism to drive the film, combined with a film-actuating mechanism comprising a plurality of rollers disposed about a center, said rollers being arranged to support the convolutions of a film-coil by one of the edges of the film, and means for rotating said rollers at a rate of speed proportional to the speed of the film through the machine and therefore rotating the film-coil and winding the film upon the film-coil.

16. A moving picture machine, mechanism therefor arranged to drive a film through said machine, and means for rotating said mechanism to drive the film, combined with a film-actuating mechanism outside of said machine, said actuating mechanism comprising a central vertical spindle, a plurality of rollers disposed about said spindle, said rollers being arranged to support the convolutions of a film-coil by one of the edges of a film, intermediate mechanism for imparting rotation to said rollers from the driving mechanism at speeds proportional to that of the film through the machine and thereby rotating the film-coil and winding the film from the machine upon the film-coil, said rollers being disposed obliquely to the radii from said spindle through the outer ends of the axes of the rollers so that they move the convolutions of the film-coil toward said central spindle.

17. A moving picture machine, mechanism therefor arranged to drive a film through said machine, and means for rotating said mechanism to drive the film, combined with a film-actuating mechanism outside of said machine, said actuating mechanism comprising a central vertical rotatable spindle, a plurality of rollers disposed about said spindle, said rollers being arranged to support the convolutions of a film-coil by one of the edges of the film, intermediate mechanism for imparting rotation to said rollers from the driving mechanism at speeds proportional to that of the film through the machine, said rollers being arranged to rotate the film-coil and to wind the film from the machine upon the outside of the film-coil, said film-driving mechanism in the machine being arranged to unwind the film-coil from its inner convolutions and to draw the film into the machine.

18. A moving picture machine, mechanism therefor arranged to drive a film through said machine, and means for rotating said mechanism to drive the film combined with a film-actuating mechanism outside of said machine, said actuating mechanism comprising a base, a central vertical rotatable spindle, a plurality of rollers of resilient material disposed about said spindle, said rollers having their upper surfaces projecting through said base at right-angles to the spindle and arranged to support the convolutions of a film-coil by one of the edges of the film, intermediate mechanism for imparting rotation to the spindle from the driving mechanism at speeds proportional to that of the film through the machine, gearing for transmitting the rotation of the spindle to the rollers, said rollers being arranged to rotate the film-coil and to wind the film from the machine upon the outside of the film-coil, the rollers being disposed obliquely to the radii from said spindle through the outer ends of the axes of the rollers so that they move the convolutions of the film-coil toward the central spindle, the inner diameter of said rollers being greater than their outer diameter, and means for causing the actuating mechanism of the machine to unwind the film-coil from its inner convolutions and to draw the film into the machine.

19. A moving picture machine, mechanism within said machine arranged to drive a film through said machine, and means for rotating said mechanism to drive the film, combined with a film-actuating mechanism outside of said machine, said actuating mechanism comprising a base, a central vertical rotatable spindle, a plurality of rollers of resilient material disposed about said spindle, said rollers having their upper surfaces projecting through said base at right-angles to the spindle and arranged to support the convolutions of a film-coil by one of the edges of the film, intermediate mechanism for imparting rotation to the spindle from the driving mechanism at speeds proportional to that of the film through the machine, gearing for transmitting the rotation of the spindle to the rollers, said rollers being arranged to rotate the film-coil and to wind the film from the machine upon the outside of the film-coil, the rollers being disposed obliquely to the radii from said spindle through the outer ends of the axes of the rollers so that they move the convolutions of the film-coil toward the central spindle, the inner diameter of said rollers being greater than their outer diameter, means for causing the actuating mechanism of the machine to unwind the film-coil from its inner convolutions to draw the film into the machine, guiding rollers adjustably supported upon said base, and a metallic cover for the film-coil.

20. A film-actuating device comprising a base and a series of positively driven rollers therein having their upper surfaces in a plane at right-angles to the axis of a film-coil, and means for delivering the film to said rollers with its edge in contact with said surfaces.

In testimony whereof I have signed my name to this specification in the presence of two subscribing witnesses.

CHARLES R. UEBELMESSER.

Witnesses:
ELLA TUCH,
CYRUS P. JONES.